United States Patent
Rokutan

[11] Patent Number: 5,392,268
[45] Date of Patent: Feb. 21, 1995

[54] OPTICAL RECORDING/REPRODUCING APPARATUS FOR REPRODUCING INFORMATION OF MULTIPLE TRACKS CAPABLE OF CORRECTING UNEVEN ILLUMINATION OF THE MULTIPLE TRACKS

[75] Inventor: Takao Rokutan, Higashimurayama, Japan

[73] Assignee: Olympus Optical Co., Ltd., Tokyo, Japan

[21] Appl. No.: 911,104

[22] Filed: Jul. 9, 1992

[30] Foreign Application Priority Data

Jul. 18, 1991 [JP] Japan .................. 3-178384

[51] Int. Cl.$^6$ ............................. G11B 7/00
[52] U.S. Cl. .................. 369/54; 235/456; 369/59; 369/124
[58] Field of Search .................. 235/454, 456; 369/44.29, 44.35–44.36, 44.41–44.42, 48, 54, 58, 59, 124

[56] References Cited

U.S. PATENT DOCUMENTS

| | | | |
|---|---|---|---|
| 4,700,337 | 10/1987 | Inagawa et al. | 369/59 X |
| 4,706,236 | 11/1987 | Yoda | 369/59 |
| 4,924,199 | 5/1990 | Hashimoto et al. | 235/456 X |
| 5,073,700 | 12/1991 | D'Onofrio | 235/456 X |
| 5,105,417 | 4/1992 | Matsueda et al. | 369/59 X |
| 5,107,472 | 4/1992 | Fujiwara et al. | 369/59 X |
| 5,164,933 | 11/1992 | Matsueda | 369/59 |

*Primary Examiner*—W. R. Young
*Attorney, Agent, or Firm*—Armstrong, Westerman, Hattori, McLeland & Naughton

[57] ABSTRACT

A light beam emitted from a light emitting element is trimmed by a collimation lens to produce a parallel light. The parallel light is converged on an optical card by an objective. Light returned from the optical card forms an image on a read/track detector through a beam splitter. A binary-coded signal generator generates binary-coded signals from detected signals of the read/track detector. The binary-coded signal generator comprises a plurality of I-V converters for converting the detected signals in every track of the read/track detector in current and voltage, and a plurality of binary circuits for comparing the signals converted in current and voltage with a plurality of comparison values and thus generating binary-coded signals.

6 Claims, 8 Drawing Sheets

PRIOR ART

OPTICAL RECORDING/REPRODUCING APPARATUS FOR REPRODUCING INFORMATION OF MULTIPLE TRACKS CAPABLE OF CORRECTING UNEVEN ILLUMINATION OF THE MULTIPLE TRACKS

BACKGROUND OF THE INVENTION

1. Field of the Invention

The present invention relates to an optical recording-/reproducing apparatus for illuminating a plurality of tracks on an information recording medium and recording and/or reproducing information on or from the plurality of tracks simultaneously.

2. Description of the Related Art

With the development of information industries, an optical information recording/reproducing apparatus has won popularity as a large-capacity storage in recent years. The optical information recording/reproducing apparatus includes an optical card apparatus in which an optical card is used as a recording medium to record and/or reproduce information. The optical card has a storage capacity that is several thousands times or ten thousand times larger than a magnetic card. Although the optical card as well as the optical disk cannot be rewritten, the large storage capacity of one to two megabytes the optical card has offers a large range of applications, such as a bankbook, a portable map, and a prepaid card for shopping. Moreover, the feature that the optical card cannot be rewritten proposes the usage as a personal health care card and other applications in which data must not be modified. Various optical information recording/reproducing apparatuses have been proposed to record or reproduce information using an optical disk as a recording medium in the past.

In optical information recording/reproducing apparatuses using optical cards, an optical card is reciprocated to record or reproduce information. Therefore, the reproduction speed is not very high.

In an effort to speed up reproduction, multiple tracks are read simultaneously during reproduction (hereafter, Multi-track Read).

A system of an optical information recording/reproducing apparatus based on Multi-track Read will be described as related art in conjunction with the drawings.

Figure 7:
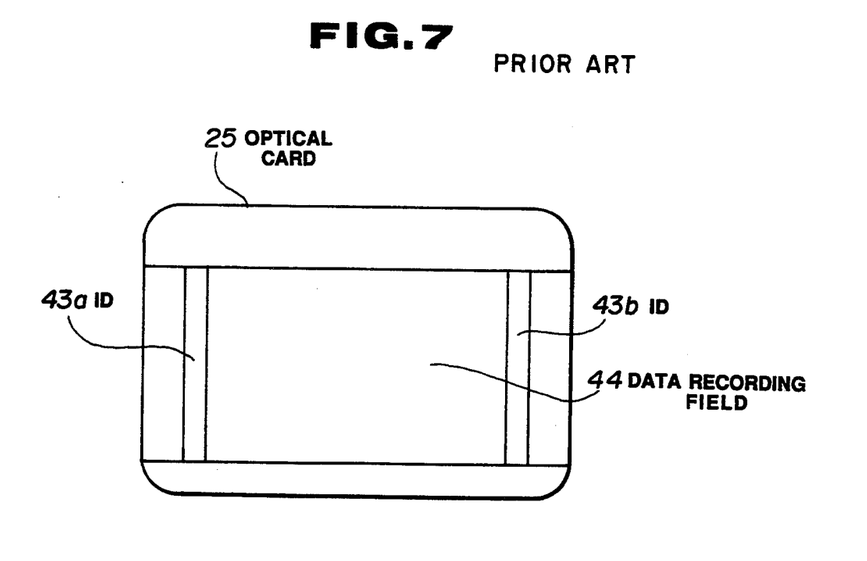
FIG. 7 shows an appearance of an optical card.

FIG. 7 shows an optical card. An optical card 25 is made up of ID fields 43a and 43b in which track address information has been recorded, and a data recording field 44 for recording/ reproducing data.

Figure 8:
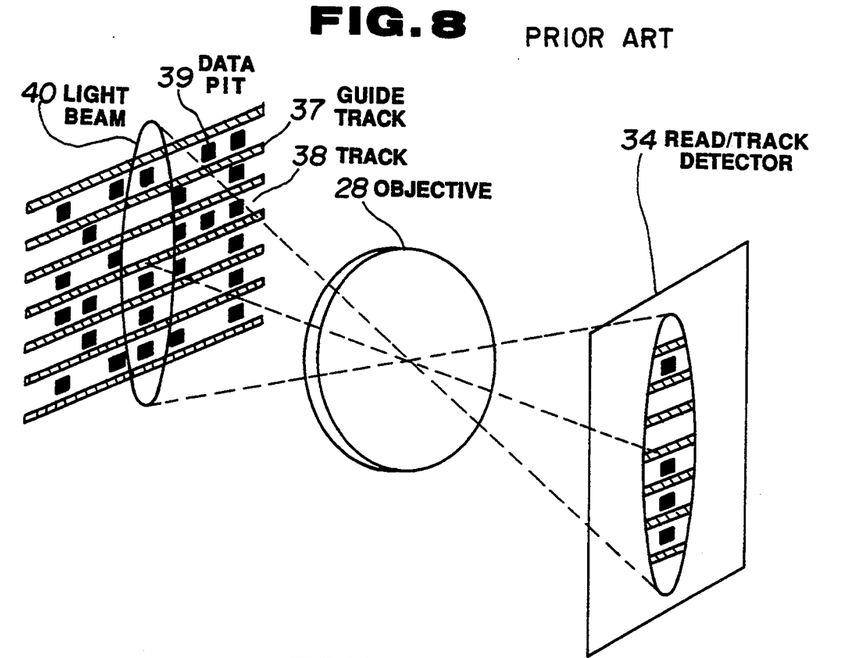
FIG. 8 is an explanatory diagram outlining the relationship between a pattern on an optical card and a read/track detector.

FIG. 8 outlines the relationship between a pattern on an optical card and a read/track detector 34. As shown in FIG. 8, a light beam 40 is emitted on the card. Guide tracks 37, tracks 38, and data pits 39 are imaged on the read/track detector 34 via an objective 28.

Figure 9:
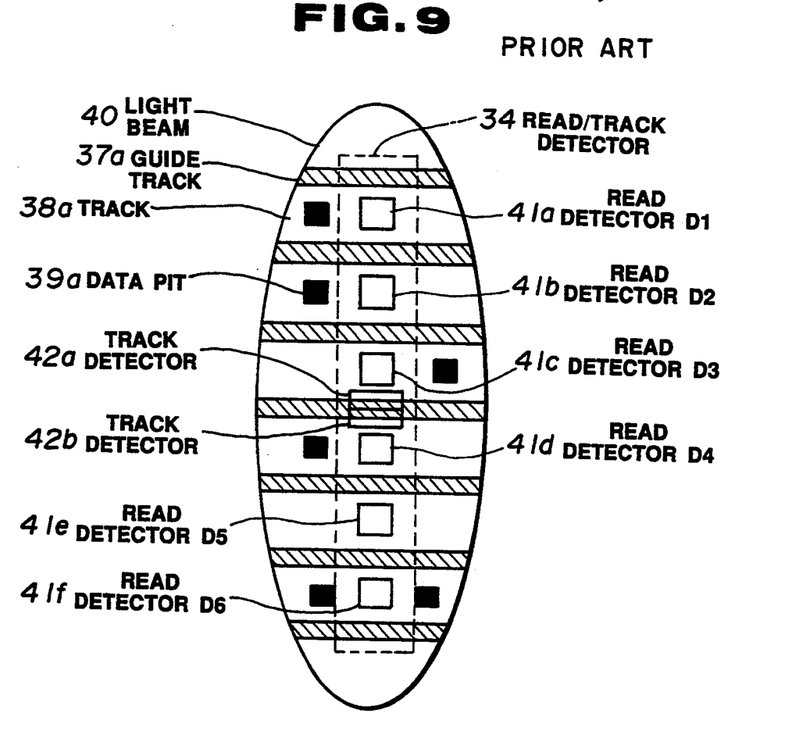
FIG. 9 is an explanatory diagram for explaining an image formed on the read/track detector.

FIG. 9 shows the read/track detector 34 in more detail. In FIG. 9, guide tracks 37a, tracks 38a, and data pits 39a correspond to the guide tracks 37, tracks 38, and data pits 39, respectively, in FIG. 7.

Symbols 41a to 41f denote read detectors D1 to D6 for reading multiple tracks (herein, six tracks) simultaneously. By calculating the difference between data read by track detectors 42a and 42b, a track error signal can be generated. Thereby, a tracking servo is activated to position the read detectors D1 to D6 on tracks 38a all the time.

A light beam 40 is split by a beam splitter (not shown) disposed on an optical path between the objective 28 and the read/track detector. The position of the light beam 40 on a focus detector (not shown) is detected to generate a focus error signal. With the focus error signal, a focusing servo is activated to focus the light beam 40.

Figure 10:
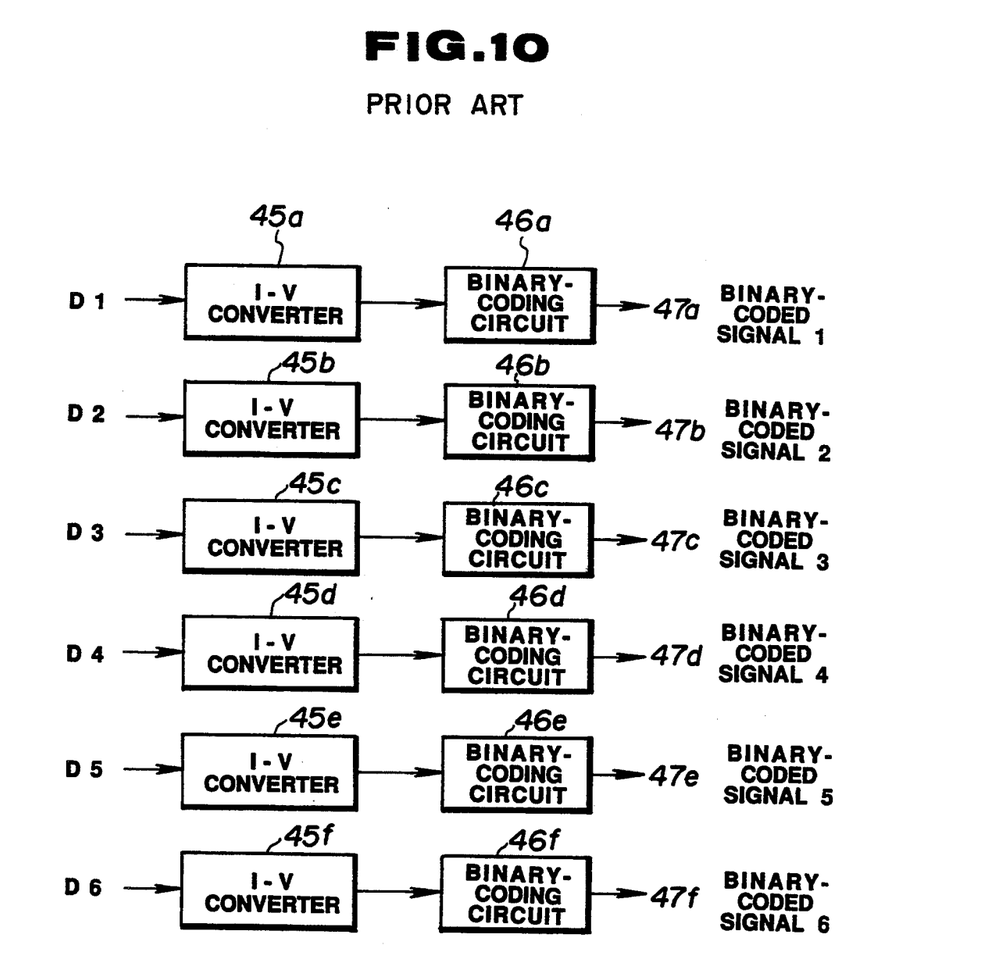
FIG. 10 is a block diagram showing a configuration of a binary-coded signal generator.

FIG. 10 is a block diagram of circuits for coding the outputs of the read detectors D1 (41a) to D6 (41f) in binary form. The outputs of the read detectors D1 (41a) to D6 (41f) are converted in current and voltage by I-V converters 45a to 45f, then compared with a fixed comparison value SH by binary circuits 46a to 46f. This provides binary-coded signals 1 (47a) to 6 (47f). Then, data is read.

Figure 11:
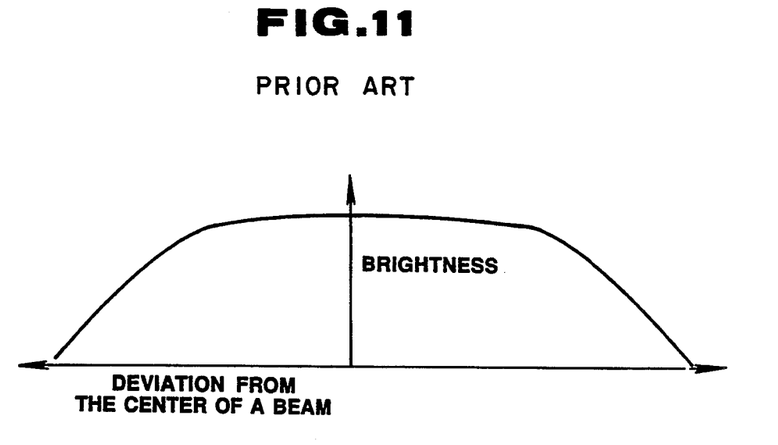
FIG. 11 is an explanatory diagram for explaining an uneven quantity of light of a light beam.

However, when multiple tracks on a card are illuminated to reproduce the information of the multiple tracks, as shown in FIG. 11, the quantities of light in the skirts of the light beam 40 for reproduction become smaller to cause an uneven quantity of light. This decreases a marginal level required for coding in binary form when data of tracks coming in the skirts of an illumination light are reproduced. At the worst, reproduction is disabled.

Figure 12:
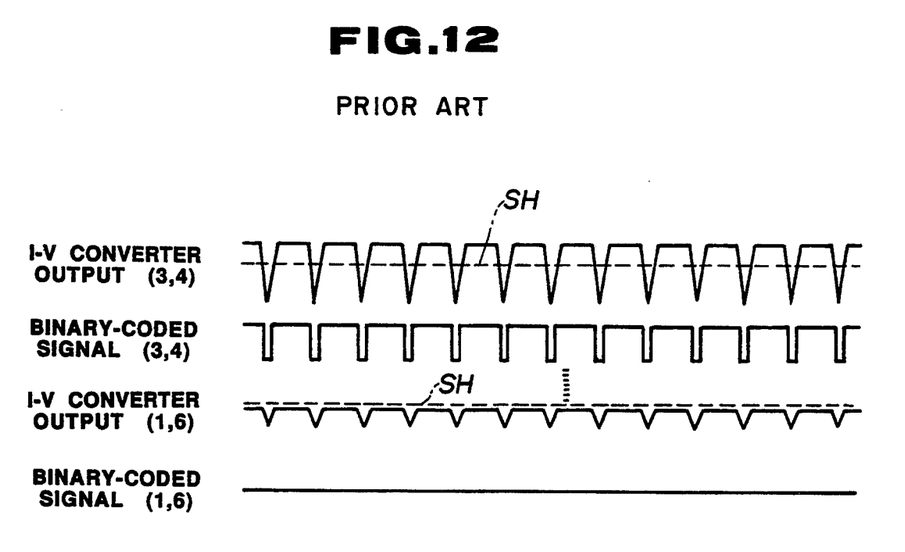
FIG. 12 is a timing chart for explaining binary-coded signals sent from the binary-coded signal generator.

In other words, FIG. 12 shows the waves of signals to be coded in binary form. The outputs of read detectors D3 (41c) and D4 (41d) (3 and 4 in FIG. 12) lying in the center of a light beam 40 are coded in binary form correctly. The outputs of read detectors D1 (41a) and D6 (41f) (1 and 6 in FIG. 12) have smaller waves because of an uneven quantity of light, and therefore cannot be coded in binary form correctly using the same comparison value SH.

OBJECTS AND SUMMARY OF THE INVENTION

The object of the present invention is to provide an optical recording/reproducing apparatus capable of reproducing information of tracks stably under optimal conditions without causing the signals of the tracks to become smaller than a marginal level required for coding data in binary form even if their quantities of light deviate are uneven.

Other object of the present invention is to provide an optical recording/reproducing apparatus for coding information recorded on multiple tracks in binary form optimally and simultaneously and thus reproducing the information quickly and stably.

An optical recording/reproducing apparatus according to the present invention comprises:

emitting means for emitting a light beam on a plurality of tracks for recording information provided on a recording surface of an optical information recording medium;

light receiving means for receiving returned light of the light beam from the recording surface and detecting information of the plurality of tracks;

amplifying means for amplifying the information of the plurality of tracks detected by the light receiving means;

binary-coding means for coding the outputs of the amplifying means in binary form; and comparison level setting means for setting a binary-coding comparison level for the binary-coding means.

Based on the results of preliminary measurement or the measured values of an uneven quantity of light, the comparison level setting means independently specifies a binary-coding comparison level for coding information of each track in binary form by the binary-coding means.

BRIEF DESCRIPTION OF THE DRAWINGS

FIGS. 1 to 3 relate to the first embodiment;

FIG. 2 (A–D) is a timing chart for explaining binary-coded signals sent from the binary-coding generator;

FIGS. 4 and 5 relate to the second embodiment;

FIG. 5(A–D) is a timing chart for explaining binary-coded signals sent from the binary-coded signal generator;

FIGS. 7 to 12 relate to related art;

DETAILED DESCRIPTION OF THE PREFERRED EMBODIMENTS

Embodiments of the present invention will be described in conjunction with the drawings.

Figure 3:
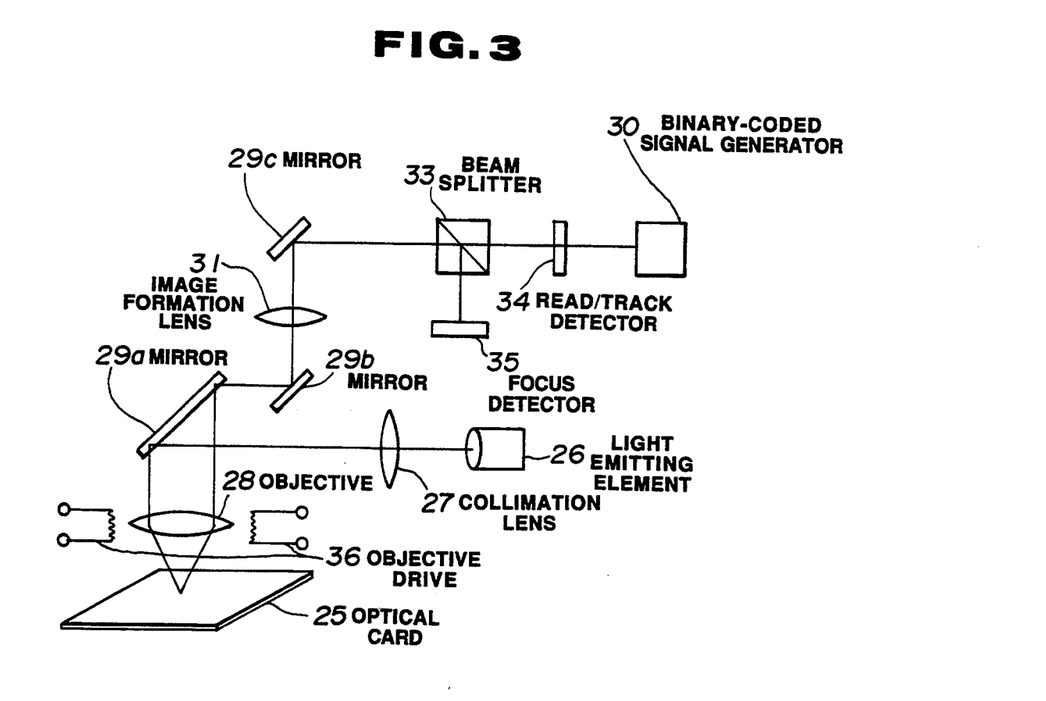
FIG. 3 is a configuration diagram showing a configuration of an optical recording/reproducing apparatus.

An optical recording/reproducing apparatus supporting Multitrack Read in the first embodiment comprises, as shown in FIG. 3, a light emitting element 26 (LD or LED) for emitting a light beam, a collimation lens 27 for trimming the light beam emitted from the light emitting element 26 to produce parallel light, an objective 28 for reflecting the parallel light produced by the collimation lens 27 and converging the parallel light on an optical card 25. Herein, light returned by the optical card 25 is reflected from a mirror 29a and a mirror 29b to pass through an image formation lens 31. Then, the light is reflected from a mirror 29c to pass through a beam splitter 33. Then, an image is formed on a read/track detector 34. A binary-coded signal generator 30 processes detected signals output by the read/track detector 34, and generates binary-coded signals. The optical card 25 has the same configuration as the optical card described in related art (See FIGS. 7 and 8).

The other light beam reflected by the beam splitter 33 enters a focus detector 35. Since the light beam is set so as to pass through a position which is off from the center axis of the objective 28, the position of the light beam changes on the focus detector 35 with the up-and-down movement of the surface of the optical card 25. Accordingly, the feature that the position of the light beam is detected by the divided focus detector 35 enables a focus error signal to generate. With the focus error signal, the objective 28 is driven by an objective lens drive 36 so that a focusing servo is activated to focus a light beam all the time.

Figure 1:
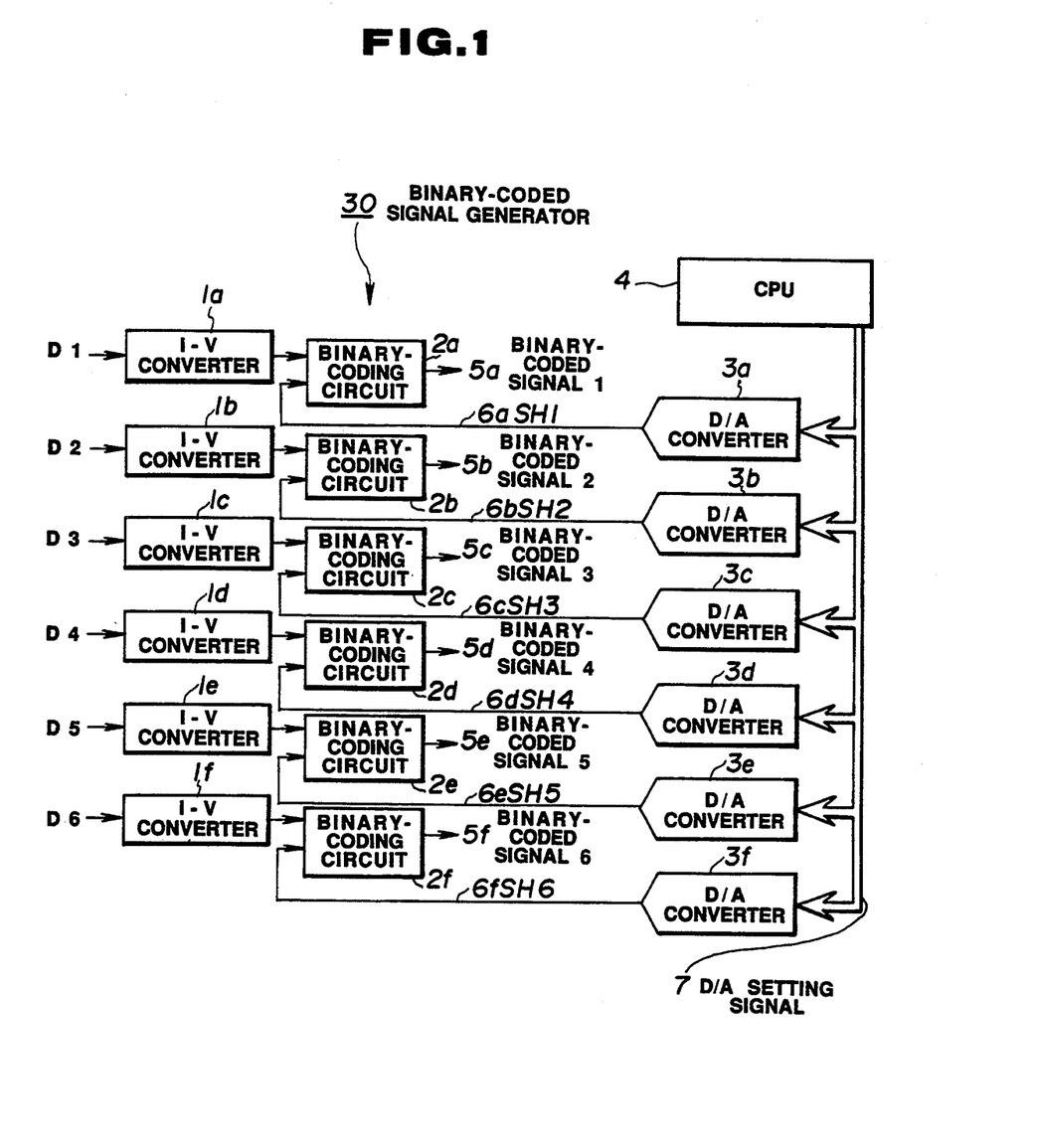
FIG. 1 is a block diagram showing a configuration of a binary-coded signal generator.

As shown in FIG. 1, a binary-coded signal generator 30 (comprises multiple detectors for reading data sent from a read/track detector 34, for example, I-V converters 1a to 1f for converting the outputs of detectors D1 to D6 in current and voltage, and binary circuits 2a to 2f for comparing the signals converted in current and voltage by the I-V converters 1a to 1f with comparison values SH1 (6a) to SH6 (6f) to generate binary-coded signals 1 (5a) to 6 (5f). The comparison values SH1 (6a) to SH6 (6f) can be set independently as outputs of D/A converters 3a to 3f according to D/A setting signals 7 output by a CPU 4.

The comparison values SH1 (6a) to SH6 (6f) are determined on the basis of uneven quantity of light of a light beam which indicates the difference between the quantity of light lying in the center of a light beam reflected by a subject and the quantity of light lying in the skirt of the light beam (hereafter, uneven quantity of light of a light beam) emitted onto an optical card 25. Herein, the measured values are measured in advance (for example, in the adjustment process during assembly).

To be more specific, assuming that a quantity of light of a read detector D1 lying in a skirt of a light beam is 50% of a quantity of light of a read detector D3 lying in the center of the light beam, a comparison value SH1 (6a) for the read detector D1 is set to be 50% of a comparison value SH3 (6c) for the read detector D3.

Figure 2:
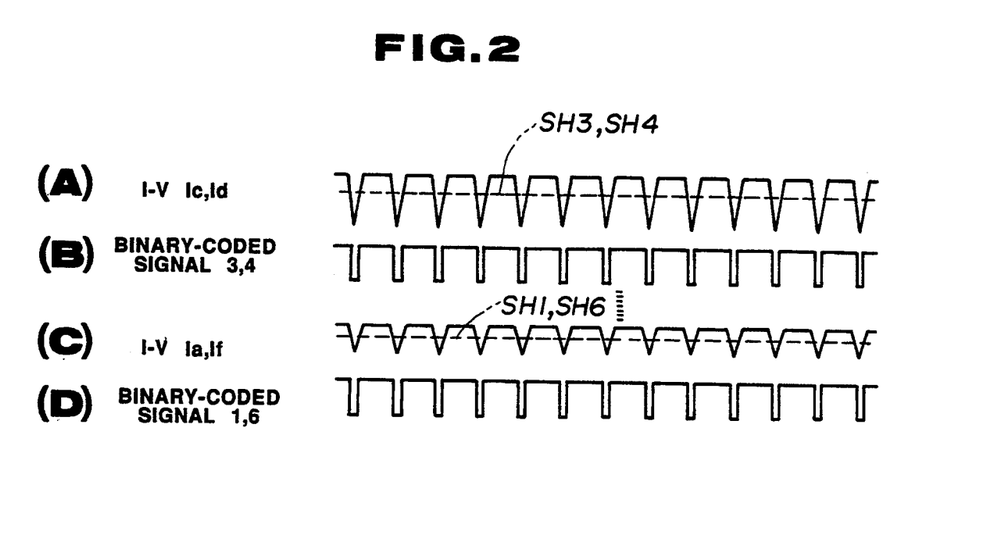

In an optical recording/reproducing apparatus having the aforesaid configuration, as shown in FIG. 2, the outputs of I-V converters 1c and 1d lying in the center of a light beam are coded in binary form with respect to SH3 and SH4 (FIG. 2A) to produce binary-coded signals 3 and 4 (FIG. 2B). The outputs of I-V converters 1a and if lying in the skirts of a light beam are coded in binary form with respect to SH1 and SH6 or modified SH3 and SH4 (FIG. 2C) to produce binary-coded signals 1 and 6 (FIG. 2D).

Therefore, the comparison values are varied depending on the value of the uneven quantity of light of a light beam measured in advance. This provides stable binary-coded signals.

Next, the second embodiment will be described.

Figure 4:
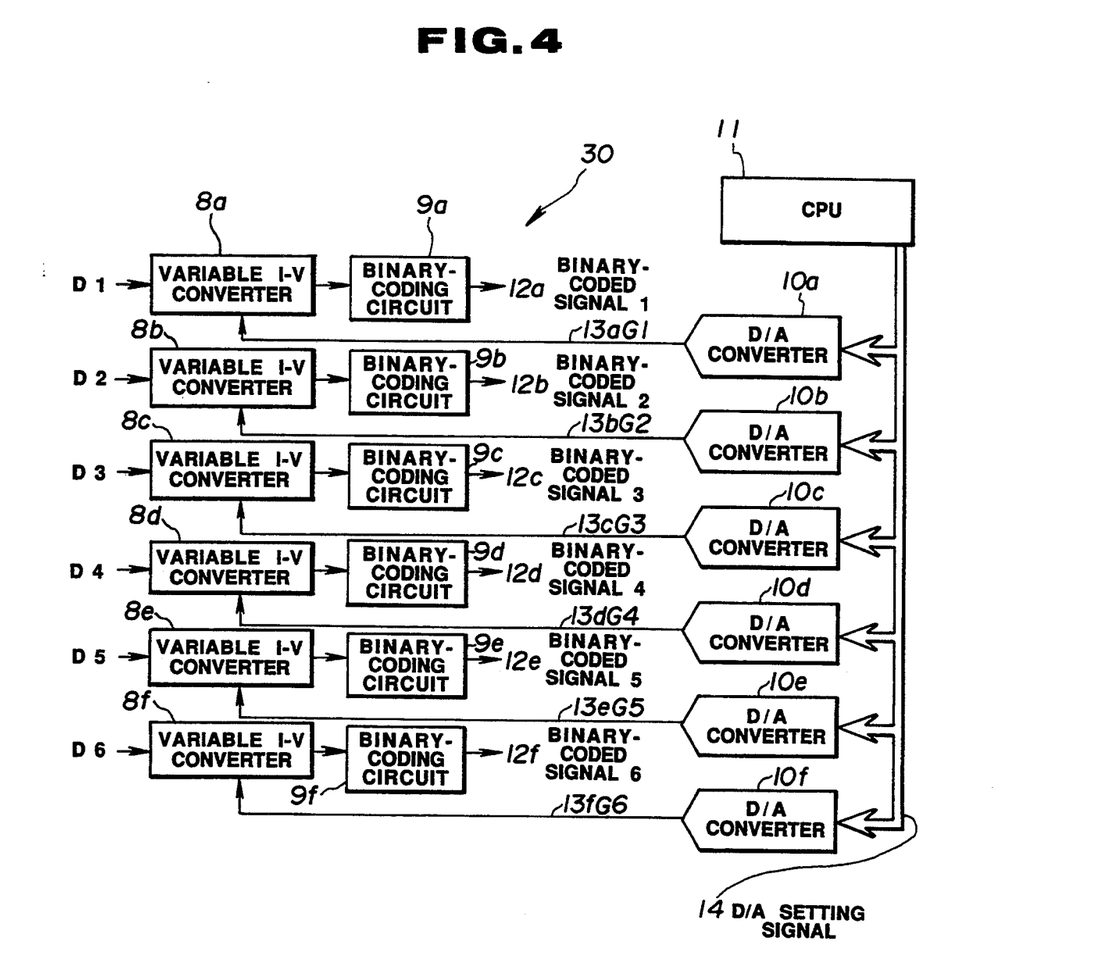
FIG. 4 is a block diagram showing a configuration of a binary-coded signal generator.

As shown in FIG. 4, a binary-coded signal generator 30a in an optical recording/reproducing apparatus of the second embodiment comprises, similarly to the first embodiment, multiple detectors for reading data sent from a read/track detector 34 (FIG. 1), for example, variable-gain I-V converters 8a to 8f for converting the outputs of detectors D1 to D6 in current and voltage, and binary circuits 9a to 9f for comparing the signals converted in current and voltage by the I-V converters 8a to 8f with fixed comparison values SH to produce binary-coded signals 1 (12a) to 6 (12f).

The gains in the variable-gain I-V converters 8a to 8f are controlled according to gain signals G1 (13a) to G6 (13f). The values of the signal G1 (13a) to G6 (13f) can be set independently as outputs of D/A converters 10a to 10f according to D/A setting signals 14 output by a CPU 11.

The G1 (13a) to G6 (13f) values are determined, similarly to the first embodiment, based on the measured value of the uneven quantity of light of a light beam emitted onto an optical card 25. Herein, the measured value is measured in advance (for example, in the process of adjustment during assembly).

More particularly, assuming that a quantity of light in a read detector D1 lying in the skirt of a light beam is 50% of a quantity of light in a read detector D3 lying in the center of the light beam, the G1 (13a) value is set to provide twice as much gain as the G3 (13c) value.

Other components and functions are identical to those of the first embodiment.

Figure 5:
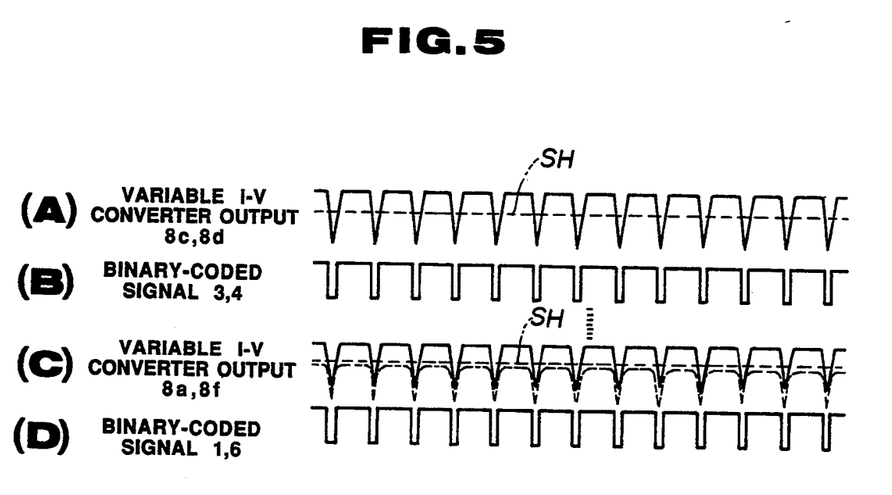

In an optical recording/reproducing apparatus of the second embodiment having the foregoing configuration, as shown in FIG. 5, the outputs of read detectors D3 and D4 lying in the center of a light beam are amplified with respect to G3 and G4, supplied as outputs of variable gain I-V converters 8c and 8d (FIG. 5A), then coded in binary form by binary circuits 9c and 9d to produce binary-coded signals 3 and 4 (FIG. 5B). The outputs of read detectors D1 and D6 lying in the skirts of the light beam are amplified with respect to G1 and G6, supplied as outputs of variable-gain I-V converters 8a and 8f (FIG. 5C), then coded in binary form by binary circuits 9a and 9f to produce binary-coded signals 1 and 6 (FIG. 5D). That is to say, the outputs of read detectors D1 and D6 are compensated to have normal levels by varying the values of G1 and G6. Consequently, correct binary-coded signals are provided.

A wave indicated with a dashed line in FIG. 5C represents an output wave of an I-V converter 8a or 8f when the G1 or G6 value is not varied to be equal to the G3 or G4 value.

Thus, the gains in variable-gain I-V converters are varied depending on the measured value of the uneven quantity of light of a light beam. Herein, the measured value is measured in advance. Consequently, stable binary-coded signals can be provided.

Next, the third embodiment will be described.

Figure 6:
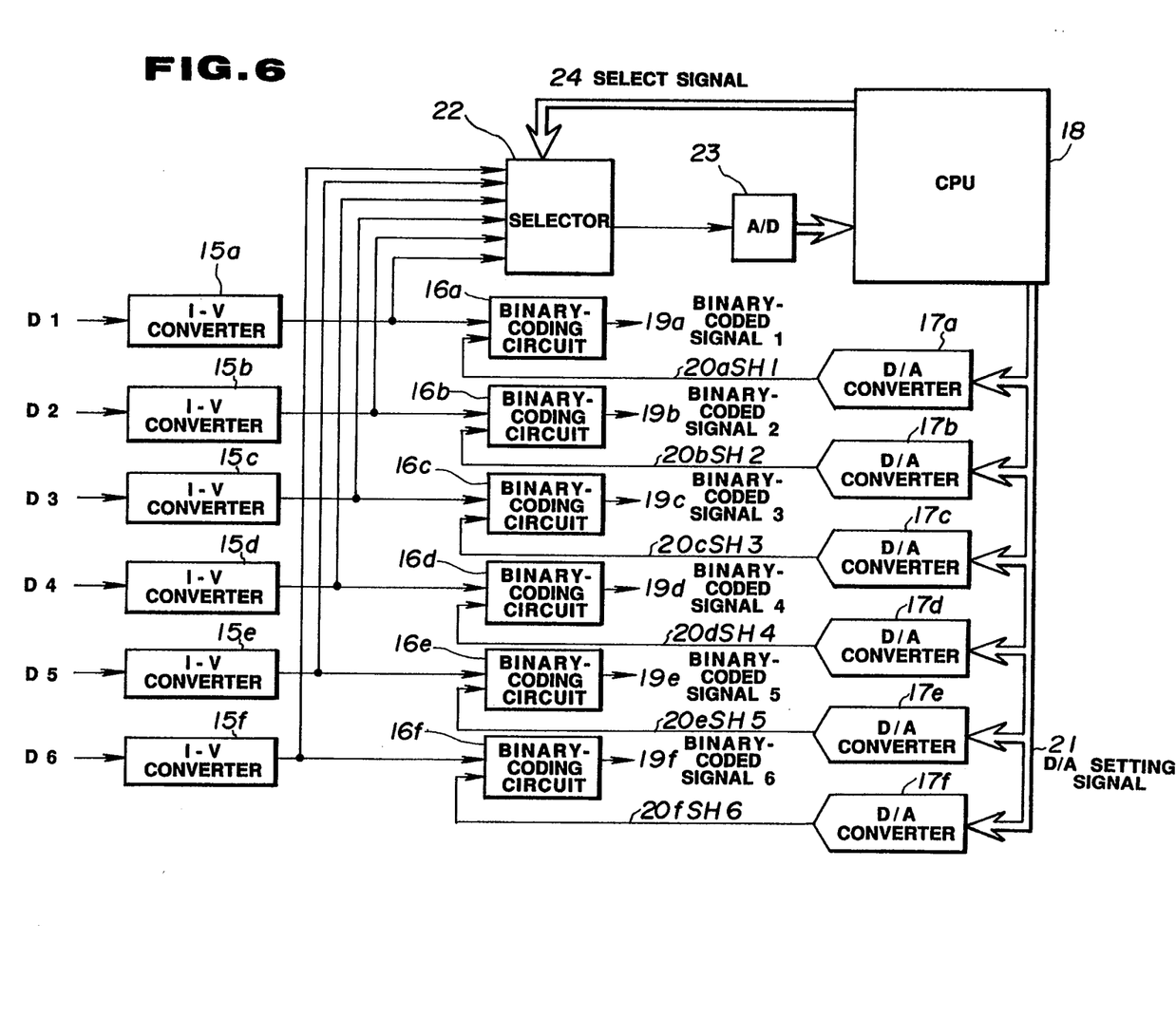
FIG. 6 is a block diagram showing a configuration of a binary-coded signal generator according to the third embodiment.

An optical recording/reproducing apparatus of the third embodiment has, as shown in FIG. 6, almost the same configuration as that of the first embodiment. That is to say, a binary-coded signal generator 30b comprises multiple detectors for reading data sent from a read/-track detector 34 (FIG. 1) for example, I-V converters 15a to 15f for converting the outputs of detectors D1 to D6 in current and voltage, and binary circuits 16a to 16f for comparing the signals converted in current and voltage by the I-V converters 15a to 15f with comparison values SH1 (20a) to SH6 (20f) and generating binary-coded signals 1 (19a) to 6 (19f). The comparison values SH1 (20a) to SH6 (20f) can be specified independently as outputs of D/A converters 17a to 17f according to D/A set signals 21 output by a CPU 18.

A difference in configuration from the first embodiment is that signals converted by I-V converters 15a to 15f are digitized by an A/D converter 23 through a selector 22, then put in a CPU 18. The CPU 18 outputs a select signal 24 to the selector 22, and thereby selects an I-V converted-signal of any of detectors D1 to D6.

Other components are identical to those of the first embodiment.

In an optical recording/reproducing apparatus of the third embodiment having the foregoing configuration, when an optical card 25 is loaded in the apparatus, a focusing servo and a tracking servo are turned on. Then, the uneven quantity of light of a light beam 40 is measured. That is, in a field outside ID fields 43a and 43b in the optical card 25 (this field of the optical card 25 has a structure shown in FIG. 8 and 9 that includes no data pit), a CPU 18 outputs a select signal 24 to a selector 22, and selects the I-V converted signal of any of detectors D1 to D6. The I-V converted values of the outputs of read detectors are converted and measured by an A/D converter 23. Thus, the CPU 18 measures the uneven values of a quantity of light of the light beam 40 which takes account of a difference of the reflectance between optical cards. Based on the results of the measurement, the SH1 to SH6 values are determined.

Provided that an I-V output value Vref obtained from a section having no uneven quantity of light of a light beam and a comparison values set in the section are obtained in advance in the reference optical card having a reference reflectance and that the I-V converted values of an optical card for which SH1 to SH6 are to be determined are Vdet1 to Vdet6, the comparison values SH1 to SH6 are determined using the measured values as follows:

$$SH1 = SHref \cdot (Vdet1 / Vref)$$
$$\vdots$$
$$SH6 = SHref \cdot (Vdet6 / Vref)$$

Other functions are identical to those of the first embodiment.

Therefore, in addition to the effect of the first embodiment, even when the uneven quantity of light varies with temperature or as time passes, this embodiment measures the uneven quantity of light of a light beam including a difference of the reflectance between optical cards when the apparatus is used. Also, this embodiment can stably acquire binary-coded signals all the time since the SH1 to SH6 values are determined on the basis of the measured values. Furthermore, even if a difference of the reflectance between the optical cards results in different levels of output signals of read detectors, the signal levels can be compensated.

The third embodiment has the configuration in which the results of the measurement are used to vary comparison values SH1 to SH6. The present invention is not limited to this configuration. For example, similarly to the second embodiment, the gains in the I-V converters including a difference of the reflectance between the optical cards may be varied to compensate binary-coded values by measuring the uneven quantity of light of the light beam 40.

In the aforesaid embodiments, six read detectors are installed to detect data on tracks. In the embodiments, the number of read detectors is not limited to any particular number. According to the number of tracks to be detected at a time, multiple read detectors, amplifying means, and binary-coding means may be installed.

According to the present invention, it is apparent that a variety of embodiments can be formed on the basis of the invention without departing from the spirit and scope of the invention. This invention is restricted to appended claims but not limited to any particular embodiments.

What is claimed is:

1. An optical recording/reproducing apparatus, comprising:
   emitting means for emitting a light beam onto a plurality of tracks for recording information provided on a recording surface of an optical information recording medium;
   multiple light receiving means for receiving returned light of said light beam from said recording surface and detecting multiple information from at least a first set of tracks and a second set of tracks of said plurality of tracks onto which said light beam is emitted, said first set of tracks coinciding with at least a central part of said light beam and said second set of tracks coinciding with at least a peripheral part of said light beam;

multiple amplifying means for amplifying the information of said plurality of tracks detected by said light receiving means;

binary-coding means for coding outputs of said amplifying means in binary form; and comparison level setting means for setting binary-coding comparison levels of said binary-coding means, which receives the output of said amplifying means, corresponding to said second set of tracks coinciding with at least said peripheral part of said light beam depending on an uneven light intensity distribution characteristic of said light beam.

2. An optical recording/reproducing apparatus according to claim 1, wherein said comparison level setting means specifies all of said binary-coding comparison levels of said binary-coding means based on output of said multiple amplifying means which depends on the uneven light intensity distribution characteristic of said light beam.

3. An optical recording/reproducing apparatus according to claim 2 wherein said comparison level setting means includes measuring means for measuring an output level of said amplifying means and specifies binary-coding comparison level of said binary-coding means on a basis of a measured value of said measuring means.

4. An optical recording/reproducing apparatus according to claim 1, wherein said optical information recording medium is an optical card.

5. An optical recording/reproducing apparatus according to claim 1 wherein a number of said binary-coding means is equal to a number of said amplifying means, and said comparison level setting means sets a binary-coding comparison level with respect to each of said binary-coding means.

6. A method of setting binary-coding comparison level of a binary circuit in an optical recording/reproducing apparatus having emitting means for emitting a light beam onto a plurality of tracks for recording information provided on a recording surface of an optical information recording medium, multiple light receiving means for receiving returned light of said light beam from said recording surface and detecting multiple information from at least a first set of tracks and a second set of tracks of said plurality of tracks onto which said light beam is emitted, said first set of tracks coinciding with at least a central part of said light beam and said second set of tracks coinciding with at least a peripheral part of said light beam, multiple amplifying means for amplifying the information of said track detected by said light receiving means and binary-coding means for comparing the output of said multiple amplifying means with a binary-coding comparison level and outputting a binary-coded signal, comprising the steps of:

detecting an uneven quantity of light of said light beam based on an uneven quantity of light of said light beam; and specifying a binary-coding comparison level of said binary-coding means, which receives the output of said amplifying means, corresponding to said second set of tracks coinciding with at least said peripheral part of said light beam depending on detected output of the uneven light intensity distribution characteristic of said light beam.

* * * * *